United States Patent
Hewitt et al.

[19]

[11] Patent Number: 6,155,607
[45] Date of Patent: Dec. 5, 2000

[54] QUICK CONNECT COUPLING

[75] Inventors: Robert W. Hewitt, Memphis; Thomas L. Renfro, Bartlett, both of Tenn.

[73] Assignee: Parker-Hannifin Corporation, Cleveland, Ohio

[21] Appl. No.: 09/244,464

[22] Filed: Feb. 4, 1999

Related U.S. Application Data

[60] Provisional application No. 60/074,845, Feb. 17, 1998.

[51] Int. Cl.$^7$ .................................................... F16L 35/00
[52] U.S. Cl. .......................... 285/81; 285/322; 285/86; 285/81
[58] Field of Search .................................. 285/322, 309, 285/82, 84, 86, 87, 81

[56] References Cited

U.S. PATENT DOCUMENTS

| | | |
|---|---|---|
| 753,096 | 2/1904 | Osten et al. . |
| 991,374 | 5/1911 | Rolle . |
| 2,784,987 | 3/1957 | Corcoran .................................. 285/322 |
| 3,588,149 | 6/1971 | Demker et al. . |
| 3,853,338 | 12/1974 | Wilson ....................................... 285/86 |
| 3,933,378 | 1/1976 | Sandford et al. . |
| 4,055,359 | 10/1977 | McWethy . |
| 4,178,023 | 12/1979 | Guest . |
| 4,332,402 | 6/1982 | Shellhause . |
| 4,398,757 | 8/1983 | Floyd et al. ............................. 285/322 |
| 4,500,117 | 2/1985 | Ayers et al. . |
| 4,637,640 | 1/1987 | Fournier et al. . |
| 4,647,082 | 3/1987 | Fournier et al. . |
| 4,722,560 | 2/1988 | Guest . |
| 4,793,637 | 12/1988 | Laipply et al. . |
| 4,889,368 | 12/1989 | Laipply . |
| 4,923,228 | 5/1990 | Laipply . |
| 5,113,900 | 5/1992 | Gilbert . |
| 5,211,197 | 5/1993 | Marrison et al. . |
| 5,228,729 | 7/1993 | McElroy et al. . |
| 5,356,181 | 10/1994 | Shirogane et al. . |
| 5,474,335 | 12/1995 | Sorkin ..................................... 285/322 |
| 5,482,083 | 1/1996 | Jenski . |
| 5,540,463 | 7/1996 | Protokar . |
| 5,989,240 | 11/1999 | Strowe ..................................... 285/81 |

FOREIGN PATENT DOCUMENTS

| | | |
|---|---|---|
| 0 031 409 | 7/1981 | European Pat. Off. . |
| 0 268 511 | 5/1988 | European Pat. Off. . |

*Primary Examiner*—Terry Lee Melius
*Assistant Examiner*—Aaron Dunwoody
*Attorney, Agent, or Firm*—Christopher H. Hunter

[57] ABSTRACT

A quick coupler for a first tube with a plug end and a second tube with a socket end, the first tube including a bead formed proximate the distal end of the tube and a circumferential groove between the bead and the distal end. A first O-ring is disposed in the groove, and a second O-ring is received about the first tube adjacent the forward end of the bead. The plug end of the tube is received within the socket of the second pipe and a collet and shell retain the pipes together. The collet includes a cylindrical sidewall with a series of resilient segmented fingers. Each of the fingers has a radially inward directed tab at its distal end. The collet is slid along the first tube until an annular endwall on the collet abuts the bead, with the fingers resiliently outwardly deflecting to surround the socket of the second tube and retain the first tube to the second tube. The shell is then slid over the collet and provides an inward force on the collet to draw the tubes together. Spring tabs on the shell cooperate with a serrated portion of the collet to retain the shell on the collet. The tabs on the fingers grasp an annular flange on the socket during disconnect to initially allow the tubes to be axially separated an amount sufficient to vent pressure within the tubes.

25 Claims, 4 Drawing Sheets

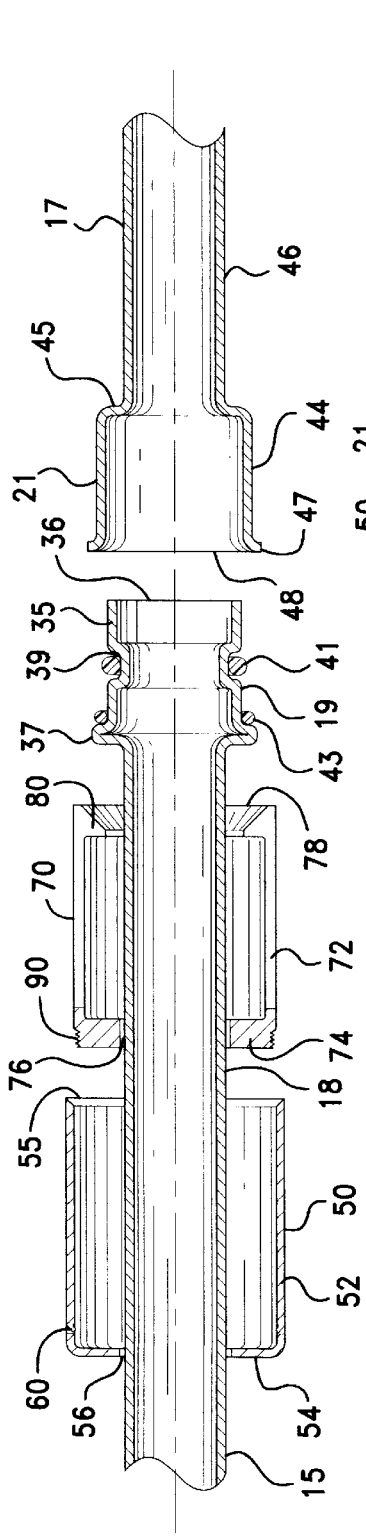
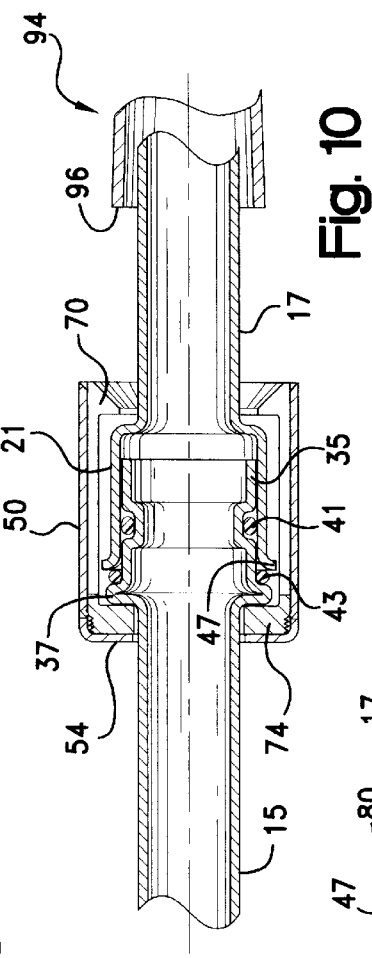
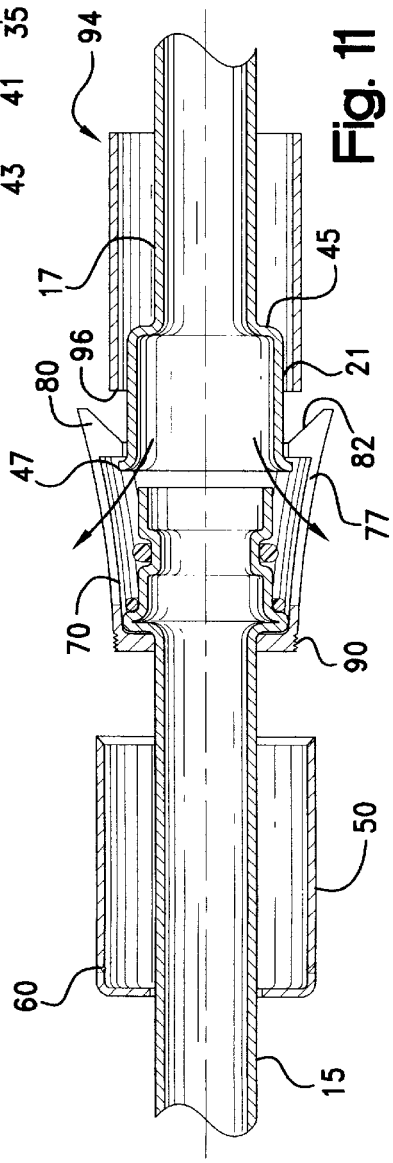

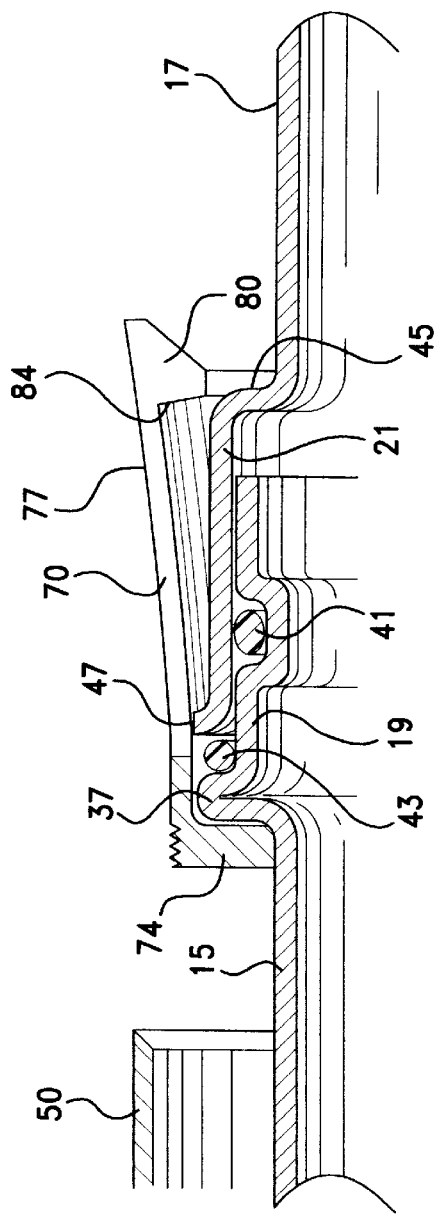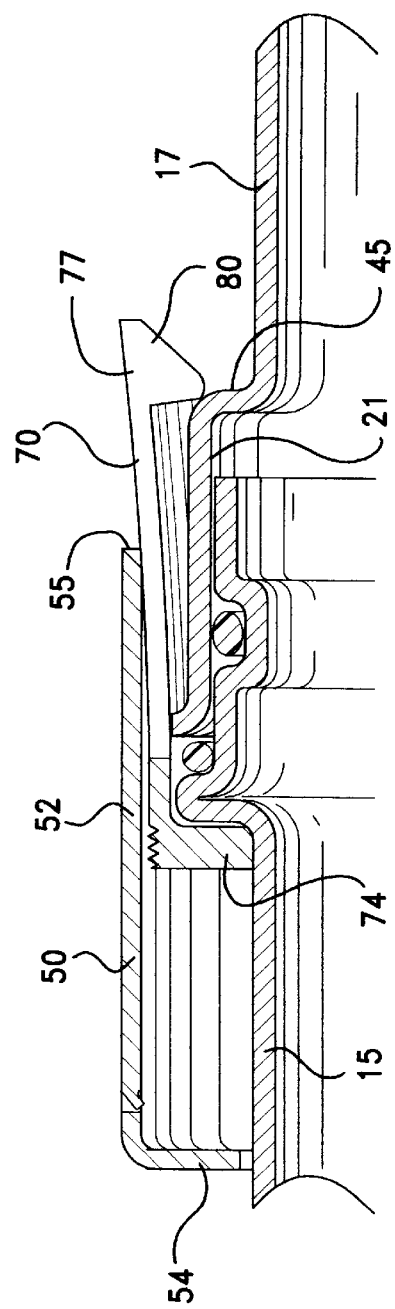

QUICK CONNECT COUPLING

RELATED CASES

The present application claims priority to U.S. Provisional application Serial No. 60/074,845; filed Feb. 17, 1998.

FIELD OF THE INVENTION

The present invention relates generally to quick connect type couplings, particularly for refrigeration and air conditioning systems.

BACKGROUND OF THE INVENTION

In many types of fluid systems, and particularly in many refrigeration and air conditioning systems, the tubes (also referred to as pipes, conduits or hoses) in the system are connected together by suitable couplings, for example by quick connect couplings. In one common type of quick connect coupling, a first tube, the plug member, is inserted into a second tube, a socket member, and normally sealed by an annular seal ring (O-ring) disposed between the plug member and the socket member. The tubes are retained, with the plug member fully inserted into the associated socket member, by means of a retainer. Known retainers have included threaded connectors, segmented collets, and locking leaf-springs, collars and shells. Some of these retainers are shown, for example, in U.S. Pat. Nos. 4,332,402; 4,500,117; 5,113,900; and 5,540,463, and European Patent No. 0 031 409.

While the known quick couplers might be appropriate for certain applications, applicant believes that some of the couplers can have certain drawbacks. For example, it is believed that some of the couplers do not provide a secure, firm union between the mating tubes. This can cause excessive wear of the sealing O-ring. It is also believed that some of the known couplers lack a safety mechanism to prevent sudden separation of the mating tubes during disconnection, if pressure is present within the tubes. Further, it is believed that some known couplers are expensive to manufacture, and require numerous components or costly manufacturing steps, such as machining and brazing.

As such, it is believed that there is a demand in the industry for an improved quick connect coupler which overcomes many of the above drawbacks, and which is particularly useful for refrigeration and air conditioning systems.

SUMMARY OF THE PRESENT INVENTION

The present invention provides a new and unique quick connect type coupler which is particularly useful for refrigeration and air conditioning applications. The coupler has relatively few parts which are easily and simply manufactured. The coupler vents internal pressure to atmosphere during disconnect before allowing the entire separation of the tubes. Further, the seal between the mating tubes in the coupler is accomplished by a mechanical advantage which provides a secure, firm union between the tubes.

According to the preferred aspect of the present invention, the coupler includes first and second tubes, where the first tube includes a plug end with an annular bead, and a circumferential groove between the bead and the distal end of the tube. A first O-ring is received in the groove, and a second O-ring is received about the first tube against the forward surface of the bead. The second tube includes a radially-enlarged socket to receive the plug end of the first tube. The socket includes a radially-outward projecting flange at the distal end of the tube. When the first tube is inserted into the second tube, the first O-ring seals between the opposed cylindrical surfaces of the plug end and the socket, while the second O-ring is compressed between the flange on the socket and the bead on the first tube.

An outer cup-shaped shell and an inner segmented collet are received about the first tube. The collet includes resilient fingers extending axially along the collet toward the distal end of the tube. Each of the fingers includes a radially-inward projecting tab at its distal end.

After the first tube is inserted into the second tube, the collet is slid along the first tube until the tabs on the fingers pass over the bead on the first tube, the flange on the second tube, and surround the socket portion on the second tube. The tabs on the fingers force the fingers to resiliently outwardly deflect to pass over the bead, annular flange and socket portion. The fingers then return to their normal position after the tabs pass over the end of the socket portion of the second tube to grasp the socket and retain the second tube to the first tube.

The shell is then slid over the collet until the shell entirely surrounds the collet. The shell forces the fingers of the collet radially-inward to force the tabs around the socket portion of the second tube, and draw the second tube tightly against the first tube. The mechanical advantage of the shell causes the flange of the second tube to compress the second O-ring against the bead on the first tube to improve the fluid-tight seal between the tubes. The shell also forces the annular flange on the second tube, and hence the socket portion of the second tube, radially-inward to compress the first O-ring, which also improves the fluid-tight seal between the first tube and second tube.

To facilitate retaining the shell on the collet, the collet includes a serrated (threaded) portion toward the rear end of the collet, that is, on the end of the collet spaced away from the fingers. The shell includes a series of spring tabs formed integrally with the shell and projecting radially inward. The spring tabs engage the serrated portion to prevent unintentional removal of the shell from the collet. The shell can still be removed from the collet by rearward axial force applied to the shell.

When it is desirable to disconnect the tubes, the shell is slid rearward off the collet, and a removal tool comprising a cylindrical tube is applied against the tab ends of the spring fingers. The spring fingers expand, and initially allow the tabs to pass over the end of the socket portion of the second tube. The tubes separate a certain axial amount until the tabs engage the annular flange at the distal end of the second tube. The separation of the tubes at this point is sufficient to vent pressure within the tubes to atmosphere, while the tabs prevent sudden separation of the tubes. The removal tool can then be applied again against the tabs to cause the tabs to expand and allow the tabs to pass over the annular flange on the socket to entirely disconnect the tubes.

The quick-connect coupler of the present invention thereby provides a secure, firm union between the mating tubes, is relatively simple and easy to manufacture from few parts, and allows venting of pressure within the tubes prior to full disconnect.

Further features of the present invention will become apparent to those skilled in the art upon reviewing the following specification and attached drawings.

BRIEF DESCRIPTION OF THE DRAWINGS

FIG. 2 is a cross-sectional side view of the coupling of FIG. 1;

FIG. 8 is a cross-sectional side view of a portion of the coupling illustrating a first step in the connection process;

FIG. 9 is a cross-sectional side view of the portion of the coupling illustrating a second step in the connection process;

FIG. 10 is a cross-sectional side view of the coupling illustrating the tubes fully connected; and FIG. 11 is a cross-sectional side view of the coupling illustrating a first step in the disconnection process.

DETAILED DESCRIPTION OF THE PREFERRED EMBODIMENT

Figure 1:
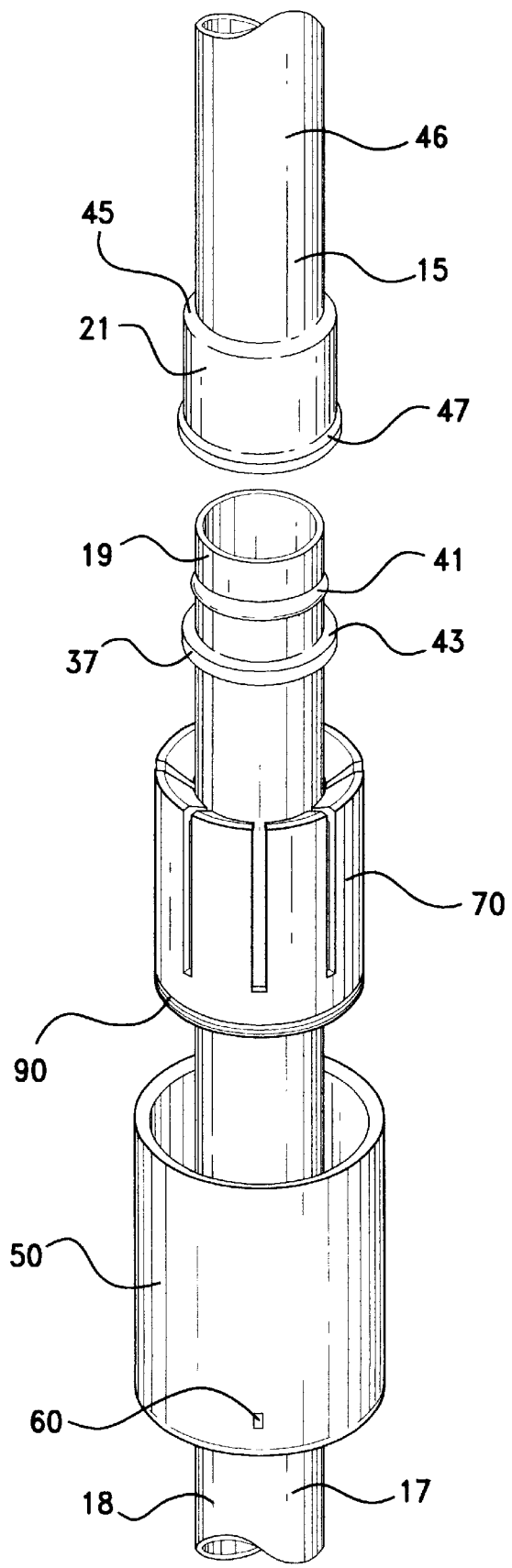
FIG. 1 is an elevated perspective view of a quick-connect coupling constructed according to the principles of the present invention, shown prior to connection.

Referring to the drawings, and initially to FIGS. 1 and 2, a quick-connect coupling constructed according to the principles of the present invention is shown, which connects a first tube 15 to a second tube 17.

First tube 15 includes a main cylindrical portion 18 with a plug end 19. The plug end 19 is received within an enlarged socket end 21 of second tube 17. The plug end 19 includes a cylindrical wall portion 35 which extends inwardly from the distal open end 36 of the tube to a radially outward-projecting annular bead 37. An outwardly-facing circumferential groove 39 is provided in cylindrical portion 35 between bead 37 and the distal end 36. Cylindrical portion 35 of plug end 19 is dimensioned to be closely received within the socket end 21 of second tube 17. First tube 15 is preferably formed from appropriate high strength, rigid material, such as metal. Bead 37 and groove 39 can be formed using any appropriate machine, such as an end forming machine.

A first resilient O-ring 41, preferably formed of appropriate elastomeric material, is disposed within groove 39. A second O-ring 43, preferably also formed from appropriate elastomeric material, is provided around the cylindrical portion 35 of tube 15 adjacent and abutting the forward surface of bead 37. First and second O-rings 41, 43 provide a fluid seal between tubes 15 and 17, as will be described more fully below.

Socket 21 of second tube 17 includes a cylindrical sidewall 44 and an annular shoulder or step 45 which extends radially inward and interconnects sidewall 44 with a main cylindrical portion 46. As indicated above, cylindrical sidewall 44 is dimensioned to closely receive plug end 19 of first tube 15. A radially outward-projecting annular flange 47 is provided around the distal open end 48 of socket 21. Flange 47 preferably has about the same outside diameter as bead 37 of first tube 15. Second tube 17 is also preferably formed from appropriate high strength, rigid material, such as metal. Socket 21 and flange 47 can also be formed using any appropriate machine, such as an end forming machine.

The coupling further includes a retainer comprising an outer cup-shaped shell 50. Shell 50 includes a cylindrical sidewall 52 and an annular endwall 54 at one end of sidewall 52. The other end 55 of sidewall 52 faces the plug end 19 of tube 15. Endwall 54 includes a central circular opening 56 which receives first tube 15. The annular end wall 54 defining opening 56 has an inner diameter preferably smaller than the outer diameter of bead 37, so that the shell cannot pass completely over this bead. Shell 50 is preferably formed from appropriate rigid, high strength material, for example metal.

Figure 3:
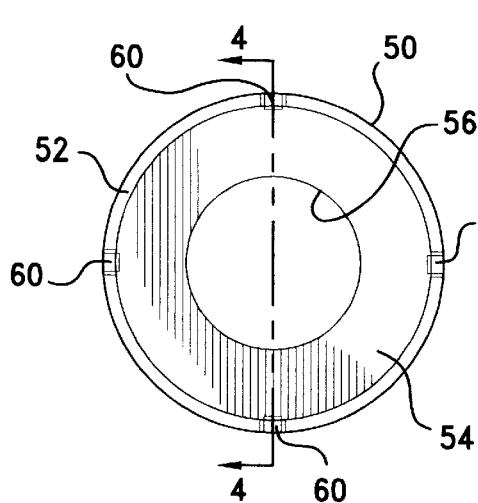
FIG. 3 is a front view of the shell for the coupling of FIG. 1.
Figure 4:
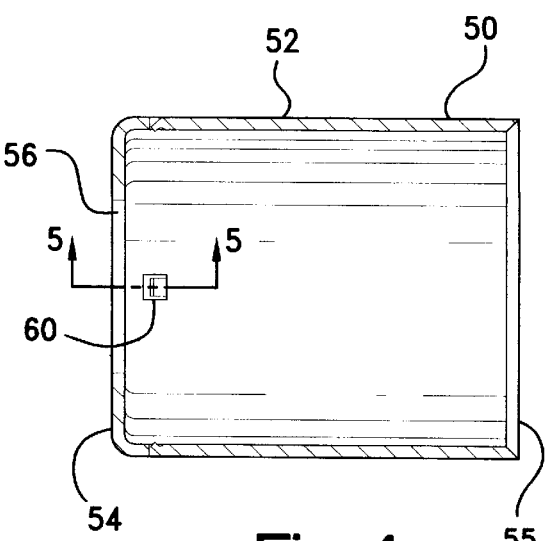
FIG. 4 is a cross-sectional side view of the shell taken substantially along the plane described by the lines 4—4 of FIG. 3.
Figure 5:
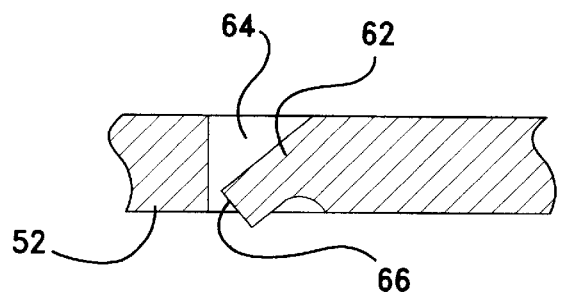
FIG. 5 is a cross-sectional view of a portion of the shell taken substantially along the plane described the lines 5—5 in FIG. 4.

Referring now to FIGS. 3–5, a series of spring tabs 60 are provided around cylindrical sidewall 52 of shell 50. Preferably four spring tab 60 are provided in equal spaced-apart relation around the circumference of sidewall 52, close to endwall 54. The number and location of tabs 60 can vary depending upon the particular application. As shown in FIG. 5, each spring tab 60 preferably includes a tab 62 formed in one piece with the sidewall and disposed within an aperture 64, and a tab end 66 which projects radially inward into the shell toward opening 56 in endwall 54. Tabs 60 can be formed using any appropriate machine, such as a stamping machine.

Referring again to FIGS. 1 and 2, the retainer further includes a segmented collet 70 dimensioned to be received within shell 50. Collet 70 includes a cylindrical sidewall 72 and an annular endwall 74. Annular end wall 74 has a central circular opening 76 which receives first tube 15. The annular end wall 74 defining opening 76 has an inner diameter preferably smaller than the outer diameter of bead 37, so that the collet also cannot pass completely over this bead.

Figure 6:
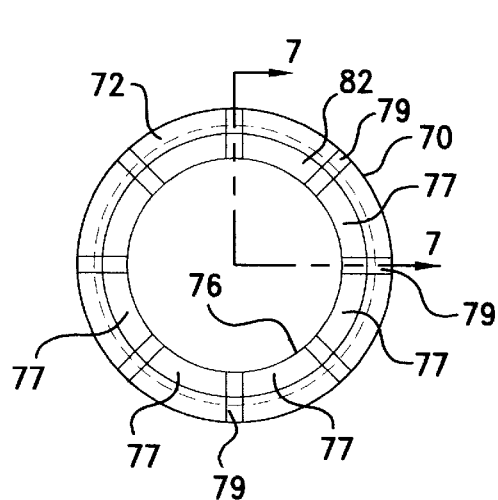
FIG. 6 is a front end view of the collet for the coupling of FIG. 1.
Figure 7:
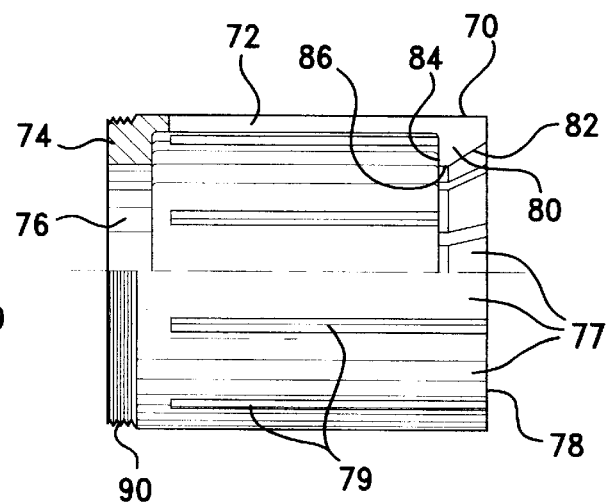
FIG. 7 is a cross-sectional side view of the collet taken substantially along the plane described by the lines 7—7 of FIG. 6.

Referring now to FIGS. 6 and 7, sidewall 72 of collet 70 includes a series of resilient spring fingers 77 which extend axially toward the distal open end 78 of collet 70. Fingers 77 are arranged equally around the circumference of the collet, and are spaced apart from each other by slots, such as indicated at 79, which extend axially along the sidewall 72 from open end 78. Preferably eight fingers are provided, however this can also vary depending upon the application. A radially-inward directed tab 80 is provided at the distal end of each finger 77. Each tab 80 includes an outer ramp surface 82 which tapers radially inward in the axial direction from the distal end 78 of the collet to an annular shoulder or step 84. Shoulder 84 extends radially outward to sidewall 72. A curved or rounded corner 86 is provided between ramp surface 82 and shoulder 84.

Collet 70 is preferably formed from a high-strength, resilient material, for example plastic, using conventional plastic forming techniques. Each of the fingers 77 when unstressed normally lies in a common circumferential plane around collet 70, and can be resiliently deflected, for example radially outwardly, by appropriate pressure applied to each of the fingers.

Collet 70 further includes a serrated section 90 along the outer surface of sidewall 72 proximate annular endwall 74. Serrated portion 90 is preferably a threaded section extending along a portion of the sidewall from the annular endwall. The reason for the serrated portion will be described more fully below.

A process for connecting first tube 15 and second tube 17 will now be briefly discussed. Referring initially to FIG. 8, the plug end 19 of first tube 15 is initially inserted into the enlarged socket end 21 of second tube 17. The sidewalls 35, 44 of the tubes are closely spaced apart, with first O-ring 41 and second O-ring 43 providing a fluid seal therebetween. Collet 70 is then slid axially forward along tube 15 until endwall 74 abuts bead 37 on tube 15. Again, the portion of the collet endwall 74 surrounding opening 76 has a dimension smaller than the outer dimension of bead 37, so that the end of the collet cannot pass over the bead. Inwardly-projecting tabs 80 of fingers 77 normally project radially inward further than the outer dimension of bead 37 on first tube 15, flange 27 on second tube 17, and socket 21 on second tube 17. Ramp surface 82 of tabs 80 therefore contacts these components in sequence as the collet is slid forward on the tube, forcing (deforming) the resilient fingers radially outward to pass over these components.

When the collet 70 is slid forward into the position illustrated in FIG. 8, tabs 80 can pass over the shoulder 45 of socket 21 to grasp the socket and retain the tubes together. The resiliency of the fingers 77 facilitates urging the tabs 80 around the shoulder 45, particularly when first tube 15 is tightly pushed into second tube 17. The axial distance between the inside surface of annular endwall 74 and shoulder 84 of tabs 80 is preferably approximately the distance between the rear surface of bead 37 and the shoulder 45 of socket 21, taking into consideration an appropriate compression of second O-ring seal 43 between bead 37 and annular flange 47.

To facilitate drawing the second tube against the first tube, outer shell 50 is next slid axially forward around collet 70, as illustrated in FIG. 9. Shell 50 is slid axially forward, with shell sidewall 52 in adjacent, close relation with collet sidewall 70, until annular endwall 54 on shell 50 abuts annular endwall 74 of collet 70. As shell 50 is slid axially forward, the forward end 55 of shell 50 forces fingers 77 radially inward, which causes tabs 80 to be forced around shoulder 45 of first tube 15. This action facilitates drawing first tube 15 against second tube 17. As illustrated in FIG. 10, when shell 50 is forced fully forward to completely surround collet 70, second O-seal 43 is tightly compressed between the bead 37 of first tube 15 and the annular flange 47 of second tube 17. Shell 50 also compresses socket 21 of second tube 17 radially inward through engagement with annular flange 47 to also compress second O-seal 41. The tubes are thus in a fully-connected, rigidly-fixed relation to one another, with a fluid-tight seal being provided between the tubes. The mechanical advantage provided by shell 50 improves the ability to quickly and easily install the retainer over the tubes.

To facilitate retaining shell 50 on collet 70, spring tabs 60 (FIG. 4) of shell 50 ratchet or ride against the serrated portion 90 (FIG. 7) of collet 70 when the shell 50 is slid forward on collet 70. This prevents the undesirable removal of shell 50 from collet 70. However, to disconnect first tube 15 from second tube 17, shell 50 is merely grasped by the user and moved axially rearward to remove the shell from collet 70, as illustrated in FIG. 11. Spring tabs 60 are resilient, and upon manual manipulation of shell 50 by sliding in the axially rearward direction, spring tabs 60 release their engagement with the serrated portion 90, and allow shell 50 to be removed from collet 70 with only slight effort.

After shell 50 is removed, fingers 77 are then released from their gripping relation with the socket 21 of second tube 17. Preferably, fingers 77 are urged radially outward by a removal tool 94. Tool 94 preferably comprises a cylindrical tube with a forward end 96 sized so as to engage the ramp surface 82 of tabs 80, and spread tabs 80 apart sufficiently so that the tabs pass over shoulder 45 at the rear end of socket 21. As illustrated in FIG. 11, when tabs 80 pass over shoulder 45, tubes 15 and 17 can be separated an axial amount sufficient such that pressure within the tubes can vent to atmosphere. As tabs 80 slide along socket 21 and the tubes are moved axially apart from one another, the tabs grasp the outwardly-extending flange 27 at the distal end of the socket, and prevent further separation of the tubes.

After pressure within the tubes is vented to atmosphere, tool 94 can be slid further axially forward against collet 70 to again contact tabs 80 and force the tabs radially outward such that they now pass over annular flange 27. When this occurs, tubes 15 and 17 are entirely disconnected.

As such, described above is a new and unique quick coupling for tubes, particularly for tubes within a refrigeration or air conditioning system. The quick coupling is relatively easy and low cost to manufacture because of the few parts, provides a safety catch to allow pressure within the tubes to vent to atmosphere before the tubes entirely disconnect, and provides a secure, firm union between two tubes.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A coupling assembly for connecting a first tube having a plug end to a second tube having a socket end, the plug-end of the first tube being closely receivable in the socket-end of the second tube and having a radially-projecting annular bead proximate the distal end of the first tube, the coupling assembly comprising:

a cup-shaped shell having a cylindrical sidewall and an endwall at one end of the sidewall, said shell endwall having a central circular opening receiving the first tube;

a collet received in said shell, said collet having a cylindrical sidewall and an endwall at one end of the collet sidewall adjacent the endwall of the shell, said collet endwall also having a central circular opening receiving the first tube, the portion of the collet endwall surrounding the opening having an inner diameter which is less than the outer diameter of the annular bead on the first tube, said collet sidewall including a series of resilient fingers extending axially toward the plug-end of the tube, each of said fingers including a radially-inward projecting tab; and a first O-ring located around the first tube between the annular bead and the distal end of the first tube, wherein said collet and shell include cooperating resilient structure toward the one end of the collet for retaining the shell on the collet.

2. The coupling assembly as in claim 1, wherein said collet includes a serrated portion on an outer surface of the collet sidewall proximate the one end of the collet, and the shell includes at least one spring tab projecting radially inward from the cylindrical sidewall of the shell and engageable with the serrated portion for retaining the shell on the collet.

3. The coupling assembly as in claim 2, wherein the serrated portion comprises threads.

4. The coupling assembly as in claim 3, wherein the at least one spring tab is formed in one piece with the cylindrical sidewall of the shell.

5. The coupling assembly as in claim 4, wherein a plurality of spring tabs are provided around the cylindrical sidewall of the shell in an even, spaced-apart arrangement.

6. The coupling assembly as in claim 1, wherein the O-ring is disposed within a circumferential groove formed in the first tube.

7. The coupling assembly as in claim 1, wherein the O-ring is disposed adjacent and against a forward end of the annular bead, facing the plug end of the tube.

8. The coupling assembly as in claim 1, wherein the first O-ring is disposed within a circumferential groove formed in the first tube, and a second O-ring is disposed adjacent and against the annular bead.

9. The coupling assembly as in claim 5, wherein the tabs have a radially inner dimension which requires the tabs to be resiliently outwardly deflected from their normal, unstressed position to pass around the socket end of the second tube, the tabs, when the tubes are connected together, surrounding the socket of the second tube and retaining the first tube to the second tube, the tabs being outwardly deflectable to pass over the socket and initially disconnect the first tube from the second tube.

10. The coupling assembly as in claim 9, wherein the socket includes a radially-outward projecting annular flange, the tabs on the collet having a radially inner dimension which requires the tabs to be resiliently outwardly deflected from their normal, unstressed position to pass around the flange of the second tube, the tabs, when the tubes are initially disconnected, engaging the flange of the second tube and retaining the first tube to the second tube, the tabs being outwardly deflectable to pass over the flange and entirely disconnect the first tube from the second tube.

11. The coupling assembly as in claim 10, wherein the annular flange is provided at a distal end of the socket, such that the first tube and second tube are retained in a position which allows pressure in the tubes to vent to atmosphere when initially disconnected.

12. A coupling assembly for connecting a first tube having a plug end to a second tube having a socket, the plug-end of the first tube being closely receivable in the socket of the second tube and having a radially-projecting annular bead proximate the distal end of the first tube, the coupling assembly comprising:
a cylindrical shell, said shell receiving the first tube;
a cylindrical collet received in said shell, said collet also receiving the first tube; said collet including a series of resilient fingers extending axially toward an end of the collet, each of said fingers including a radially-inward projecting tab, and wherein said collet includes an outer surface with a serrated portion proximate the one end of the collet, and the shell includes at least one spring tab projecting radially inward from the shell and engageable with the serrated portion for retaining the shell on the collet.

13. The coupling assembly as in claim 12, wherein the serrated portion comprises threads.

14. The coupling assembly as in claim 13, wherein an O-ring is located around the first tube between the annular bead and the distal end of the tube.

15. A coupling assembly for connecting a first tube having a plug end to a second tube having an enlarged socket end, the plug-end of the first tube being closely receivable in the socket end of the second tube and having a radially-projecting annular bead proximate the distal end of the first tube, the coupling assembly comprising:
a cylindrical shell, said shell receiving the first tube;
a cylindrical collet received in said shell, said collet also receiving the first tube; said collet including a series of resilient fingers extending axially toward an end of the collet, each of said fingers including a radially-inward projecting tab, wherein the tabs have a radially inner dimension which requires the tabs to be resiliently outwardly deflected from their normal, unstressed position to pass around the socket of the second tube, the tabs, when the tubes are connected together, surrounding the socket of the second tube and retaining the second tube to the first tube in a fluidly sealed position, the tabs being outwardly deflectable to initially disconnect the collet from the socket of the second tube, and wherein the socket includes a radially-outward projecting annular flange, the tabs on the fingers of the collet having a radially inner dimension which requires the tabs to be resiliently outwardly deflected from their normal, unstressed position to pass across the flange of the second tube, the tabs, when the tubes are initially disconnected, engaging the flange of the second tube and retaining the first tube to the second tube in a venting position, the tabs being outwardly deflectable to pass over the flange and entirely disconnect the first tube from the second tube.

16. The coupling assembly as in claim 15, wherein the socket of the second tube has i) a main cylindrical portion, ii) a cylindrical sidewall at the distal end of the second tube which has a greater radial dimension than the main cylindrical portion, and iii) an annular shoulder interconnecting the cylindrical sidewall and the main cylindrical portion, and the annular flange is provided at the distal end of the cylindrical sidewall portion of the socket of the second tube, spaced from the annular shoulder, the tabs engaging the annular shoulder of the socket to couple the first tube to the second tube when the tubes are in the fluidly sealed position, and engaging the annular flange at the distal end of the second tube when the tubes are in the venting position and allowing the tubes to separate such that the first tube and second tube are retained in an axial position which allows pressure in the tubes to vent to atmosphere.

17. The coupling assembly as in claim 16, wherein an O-ring is located around the first tube between the annular bead and the distal end of the second tube.

18. An coupling assembly, comprising:
a first tube having a plug end;
a second tube having a socket end, said plug end of said first tube being closely received in the socket of the second tube, the first tube having a radially-projecting annular bead proximate the distal end of the first tube;
a retainer disposed around the first tube, the retainer comprising a cup-shaped shell having a cylindrical sidewall and an endwall at one end of the sidewall, said shell endwall having a central circular opening receiving the first tube;
said retainer also including a collet received in said shell, said collet having a cylindrical sidewall disposed inwardly adjacent the sidewall of the shell, and an endwall at one end of the collet sidewall disposed inwardly adjacent the endwall of the shell, said collet endwall also having a central circular opening receiving the first tube, the portion of the collet endwall surrounding the opening having an inner diameter which is less than the outer diameter of the annular bead on the first tube, said collet sidewall having segmented fingers, each of said fingers including a radially-inward projecting tab, said collet also including an outer surface with a serrated portion proximate the one end of the collet, and the shell including at least one spring tab projecting radially inward from the shell and engageable with the serrated portion for retaining the shell on the collet, wherein the tabs have a radially inner dimension which requires the tabs to be resiliently outwardly deflected from their normal, unstressed position to pass around the socket of the second tube, the tabs, when the tubes are connected together, surrounding the socket of the second tube with the shell urging the fingers radially inward to retain first tube to the second tube, the tabs being outwardly deflectable when the shell is removed to pass over the socket and initially disconnect the fingers from the socket of the second tube and allow tubes to be moved axially apart from one another, and wherein the socket of the second tube includes a radially-outward projecting annular flange, the tabs on the fingers of the collet having a radially inner dimension which requires the tabs to be resiliently outwardly deflected from their normal, unstressed position to pass around the flange of the second tube when the tubes are connected, the tabs, when the tubes are initially disconnected, engaging the flange of the second tube and retaining the first tube at an axial position with respect to the second tube, the tabs being outwardly deflectable to pass over the flange and entirely disconnect the first tube from the second tube; and a first O-ring located around the first tube between the annular bead and the distal end of the tube for providing a fluid seal between the first tube and the second tube.

19. The assembly as in claim 18, wherein the first O-ring is disposed within a circumferential groove formed in the first tube between the annular bead and the distal end of the tube, and a second O-ring is disposed adjacent and against the annular bead on the first tube.

20. The coupling assembly as in claim 16, wherein the annular flange has an outer diameter which is greater than an outer diameter of the annular shoulder.

21. The coupling assembly as in claim 15, wherein said collet includes a serrated portion on an outer surface of the collet proximate another end of the collet, and the shell includes at least one spring tab projecting radially inward from the shell and engageable with the serrated portion for retaining the shell on the collet.

22. A method for uncoupling a pair of tubes, wherein one of the tubes has a plug end and the other of the tubes has a main portion with a radially enlarged cylindrical socket end and an annular flange at the distal end of the socket end extending radially outward from the socket end, the plug end of the one tube being closely received in the socket end of the other tube, a cylindrical collet surrounding the one tube with resilient fingers extending along the enlarged socket end of the other tube, the fingers having tabs projecting radially inward around the socket end to retain the one tube to the other tube, and a cylindrical shell also surrounding the one tube and having an inner dimension which closely receives the collet to retain the tabs of the collet in engaging relation with the socket, the method comprising the steps of:

sliding the shell along the one tube and off of the collet such that the fingers of the collet can be resiliently deflected radially outward sufficient such that the tabs of the fingers pass over the socket end of the other tube and the other tube can be moved axially away from the one tube until the tabs engage the flange on the end of the other tube to retain the tubes in a venting position to allow pressure in the tubes to vent to atmosphere, the fingers of the collet being further resiliently deflected radially outward sufficient that the tabs of the fingers then pass over the flange and the one tube can be entirely disconnected from the other tube.

23. The method as in claim 22, wherein the cylindrical socket of the other tube has a greater radial dimension that is greater than a radial dimension of the main cylindrical portion, and an annular shoulder interconnects the cylindrical socket and the main cylindrical portion, and the tubes are initially maintained together in a sealed condition such that the tabs engage the annular shoulder of the other tube.

24. The method as in claim 23, wherein the one tube includes an annular bead toward the distal end of the one tube, an O-ring is located around the one tube and against the bead, and a distal end of the socket of the other tube is located in sealing relation against the O-ring.

25. The method as in claim 22, wherein said collet includes a serrated portion on an outer surface of the collet proximate an end of the collet opposite from the fingers, and the shell includes at least one spring tab projecting radially inward from the shell and normally engaged with the serrated portion for retaining the shell on the collet, the at least one spring tab resiliently deflecting when the shell is removed from the collet.

* * * * *